United States Patent
Sonoda et al.

(10) Patent No.: US 10,423,784 B2
(45) Date of Patent: Sep. 24, 2019

(54) DUMMY INFORMATION INSERTION DEVICE, DUMMY INFORMATION INSERTION METHOD, AND STORAGE MEDIUM

(71) Applicant: NEC Corporation, Tokyo (JP)

(72) Inventors: Kentaro Sonoda, Tokyo (JP); Kayato Sekiya, Tokyo (JP); Yoshiya Kizu, Tokyo (JP)

(73) Assignee: NEC Corporation, Tokyo (JP)

(*) Notice: Subject to any disclaimer, the term of this patent is extended or adjusted under 35 U.S.C. 154(b) by 163 days.

(21) Appl. No.: 15/529,803

(22) PCT Filed: Nov. 30, 2015

(86) PCT No.: PCT/JP2015/005944
§ 371 (c)(1),
(2) Date: May 25, 2017

(87) PCT Pub. No.: WO2016/088351
PCT Pub. Date: Jun. 9, 2016

(65) Prior Publication Data
US 2017/0329967 A1    Nov. 16, 2017

(30) Foreign Application Priority Data
Dec. 1, 2014 (JP) .................... 2014-243147

(51) Int. Cl.
*G06F 21/56* (2013.01)
*H04L 29/06* (2006.01)
(Continued)

(52) U.S. Cl.
CPC ............. *G06F 21/56* (2013.01); *G06F 21/80* (2013.01); *H04L 51/02* (2013.01); *H04L 51/36* (2013.01);
(Continued)

(58) Field of Classification Search
CPC ....................................................... G06F 21/56
See application file for complete search history.

(56) References Cited

U.S. PATENT DOCUMENTS 8,402,170 B2 * 3/2013 Harris .................. G06F 11/366
711/100
8,528,091 B2 * 9/2013 Bowen .................. G06F 21/566
726/24
(Continued)

FOREIGN PATENT DOCUMENTS

JP    2006-139421 A    6/2006
JP    2007-174386 A    7/2007
(Continued)

OTHER PUBLICATIONS

Kido et al.; Protection of Location Privacy using Dummies for Location-based Services; Published in: 21st International Conference on Data Engineering Workshops (ICDEW'05); Date of Conference: Apr. 3-4, 2005; IEEE Xplore (Year: 2005).*
(Continued)

*Primary Examiner* — Bradley W Holder
(74) *Attorney, Agent, or Firm* — Wilmer Cutler Pickering Hale and Dorr LLP

(57) ABSTRACT

Provided is a more versatile technique that makes it possible to input dummy information in response to an attacker seeking to collect normal information that cannot be replaced with dummy information. In the present invention, a dummy information insertion device inserts dummy information into a second location that is determined using: first location information indicating a first location that contains normal information, from among all normal information in a computer, which cannot be replaced with other information; and insertion condition information that indicates conditions for determining the second location into which dummy information is to be inserted, with such dummy (Continued)

information resembling the normal information that cannot be replaced and not being present in the computer or in a local network connected to the computer.

13 Claims, 13 Drawing Sheets

(51) Int. Cl.
   *H04L 12/58* (2006.01)
   *G06F 21/80* (2013.01)

(52) U.S. Cl.
   CPC .......... *H04L 63/10* (2013.01); *H04L 63/145* (2013.01); *G06F 2221/2101* (2013.01)

(56) References Cited

U.S. PATENT DOCUMENTS

| | | | | |
|---|---|---|---|---|
| 9,092,306 | B1* | 7/2015 | Su | G06F 11/00 |
| 9,971,891 | B2* | 5/2018 | Bowen | G06F 21/566 |
| 2010/0077483 | A1* | 3/2010 | Stolfo | G06F 21/554 |
| | | | | 726/24 |
| 2011/0167494 | A1* | 7/2011 | Bowen | G06F 21/566 |
| | | | | 726/24 |
| 2012/0084866 | A1* | 4/2012 | Stolfo | G06F 21/554 |
| | | | | 726/25 |
| 2012/0309350 | A1* | 12/2012 | Kim | H04W 12/02 |
| | | | | 455/411 |
| 2013/0176857 | A1* | 7/2013 | Turner | H04L 43/50 |
| | | | | 370/241 |
| 2013/0333037 | A1* | 12/2013 | Bowen | G06F 21/566 |
| | | | | 726/23 |

FOREIGN PATENT DOCUMENTS

| | | |
|---|---|---|
| JP | 2007-266979 A | 10/2007 |
| WO | WO-2009/032379 A1 | 3/2009 |
| WO | WO-2014/103115 A1 | 7/2014 |

OTHER PUBLICATIONS

Lu et al.; PAD: privacy-area aware, dummy-based location privacy in mobile services; Published in: Proceeding MobiDE '08 Proceedings of the Seventh ACM International Workshop on Data Engineering for Wireless and Mobile Access; pp. 16-23; ACM Digital Library (Year: 2008).*

Tokumaru, H., et al., "Web Application to Secure ni [Dai 2 Kai]" Nikkei System Integration, No. 131, Feb. 26, 2004, pp. 180-185 (6 pages).

International Search Report corresponding to PCT/JP2015/005944 dated Feb. 16, 2016 (2 pages).

* cited by examiner

DUMMY INFORMATION INSERTION DEVICE, DUMMY INFORMATION INSERTION METHOD, AND STORAGE MEDIUM

CROSS-REFERENCE TO RELATED APPLICATIONS

This application is a national stage application of International Application No. PCT/JP2015/005944 entitled "Dummy Information Insertion Device, Dummy Information Insertion Method, and Storage Medium" filed on Nov. 30, 2015, which claims priority to Japanese Application No. 2014-243147 filed on Dec. 1, 2014, the disclosures of which are hereby incorporated by reference in their entirety.

TECHNICAL FIELD

The present invention relates to a dummy information insertion device, a dummy information insertion method, and a storage medium.

BACKGROUND ART

In recent years, defensive measures have been proposed against cyber attack to corporations or social infrastructure. As such a defensive measure, a countermeasure is taken of monitoring, sensing and blocking cyber attack and virus intrusion. However, due to advanced manners of attacking method, technical difficulties in perfectly securing accuracy of detecting attack, and the like, it is very difficult to perfectly protect corporations and social infrastructure from virus intrusion.

Under these circumstances, as a defensive measure premised on that cyber attack intrudes into a corporation and a network with which social infrastructure is constructed, or on that viruses have already intruded inside, it is crucial to prevent damages caused by new infection (also referred to as infection spread, secondary infection) derived from the viruses.

As one method of preventing infection spread, a technique of sensing viruses (or a computer infected with viruses) using dummy information (also referred to as false information, or trap information) is proposed.

PTL 1 discloses a device which determines whether identification information set with a terminal in advance is included and, when the set identification information is not included, detects the terminal as an infected terminal.

Additionally, PTL 2 discloses a system which stores genuine setting information necessary for transmission of an electronic mail to a mail server, and dummy setting information for the setting information. This system detects an electronic mail generated using dummy setting information as a wrongful electronic mail.

CITATION LIST

Patent Literature

[PTL 1] Japanese Unexamined Patent Publication No. 2007-266979

[PTL 2] Japanese Unexamined Patent Publication No. 2007-174386

SUMMARY OF INVENTION

Technical Problem

An attacker, who externally operates a virus or a computer infected with a virus, may perfom activities of collecting, from an infected computer, information regarding other computer in a corporation or in a social infrastructure system to which the infected computer is connected in order to spread infection in some cases. This other computer becomes a target to be infected with a virus next. Here, information regarding other computer includes information set to other computer, such as, an IP (Internet Protocol) address, a host name (or a computer name), etc. Activity of collecting such information is referred to also as reconnaissance activity.

Possible countermeasures to be taken as a method of detecting the reconnaissance activity include replacing genuine information with dummy information, or adding dummy information to genuine information. This countermeasure makes a virus (an attacker) erroneously recognize the dummy setting information as genuine setting information at the time of reconnaissance activity. This enables detecting a virus (an attacker) when the virus (the attacker) do activity to spread infection by using dummy information.

PTL 1 discloses storing dummy setting information in addition to genuine setting information in advance. However, PTL 1 fails to disclose what kind of setting information is used.

In setting information of a computer, for example, it is not easy to rewrite, to dummy information, information (internal information of a computer) which always synchronizes with an operation request by a user who operates a computer or by an application, and to insert dummy information in setting information thereof. Accordingly, with the technique recited in PTL 1, a range of dummy information to be stored inside a computer is considered to be limited to just genuine information replaceable with dummy information. Here, in genuine information, information in which replacement of a set value or the like causes problems that a computer fails to operate normally, that a computer performs operation different from intended operation, and the like is referred to as genuine information irreplaceable with dummy information, and the other genuine information is referred to as genuine information replaceable with dummy information. Thus, it is difficult to apply the technique of PTL 1 to genuine information irreplaceable with dummy information. It is accordingly difficult to input dummy information to an attacker (or an infected terminal) who tries to collect genuine information irreplaceable with dummy information.

Additionally, in the technique recited in PTL 2, target information to which dummy is set is only information necessary to transmitting an electronic mail to a mail server, and no other setting information is disclosed. Accordingly, by the technique of PTL 2, it is difficult to input dummy information to an attacker (or an infected terminal) who tries to collect other setting information.

The present invention, which has been conceived in view of the foregoing problems, aims at providing a highly versatile technique enabling input of dummy information to an attacker who tries to collect genuine information irreplaceable with dummy information.

Solution to Problem

A dummy information insertion device according to one aspect of the present invention inserts dummy information into a second location determined using first location information and insertion condition information, the first location information indicating a first location which includes genuine information irreplaceable with other information, in genuine information in a computer, the insertion condition information indicating conditions for determining a second location into which dummy information is to be inserted, the dummy information resembling the irreplaceable genuine information and not being present in the computer and in a local network connected to the computer.

Additionally, a dummy information insertion method according to one aspect of the present invention includes: determining a second location using first location information and insertion condition information, the first location information indicating a first location which includes genuine information irreplaceable with other information, in genuine information in a computer, the insertion condition information indicating conditions for determining a second location into which dummy information is to be inserted, the dummy information resembling the irreplaceable genuine information and not being present in the computer and in a local network connected to the computer; and inserting the dummy information into the determined second location.

A computer program which achieves the dummy information insertion device or the dummy information insertion method desceibed above by a computer, and a computer readable storage medium which stores the computer program are also within the scope of the present invention.

Advantageous Effects of Invention

The present invention enables input of dummy information to an attacker who tries to collect various genuine information irreplaceable with dummy information.

DESCRIPTION OF EMBODIMENTS

First Example Embodiment

Figure 1:
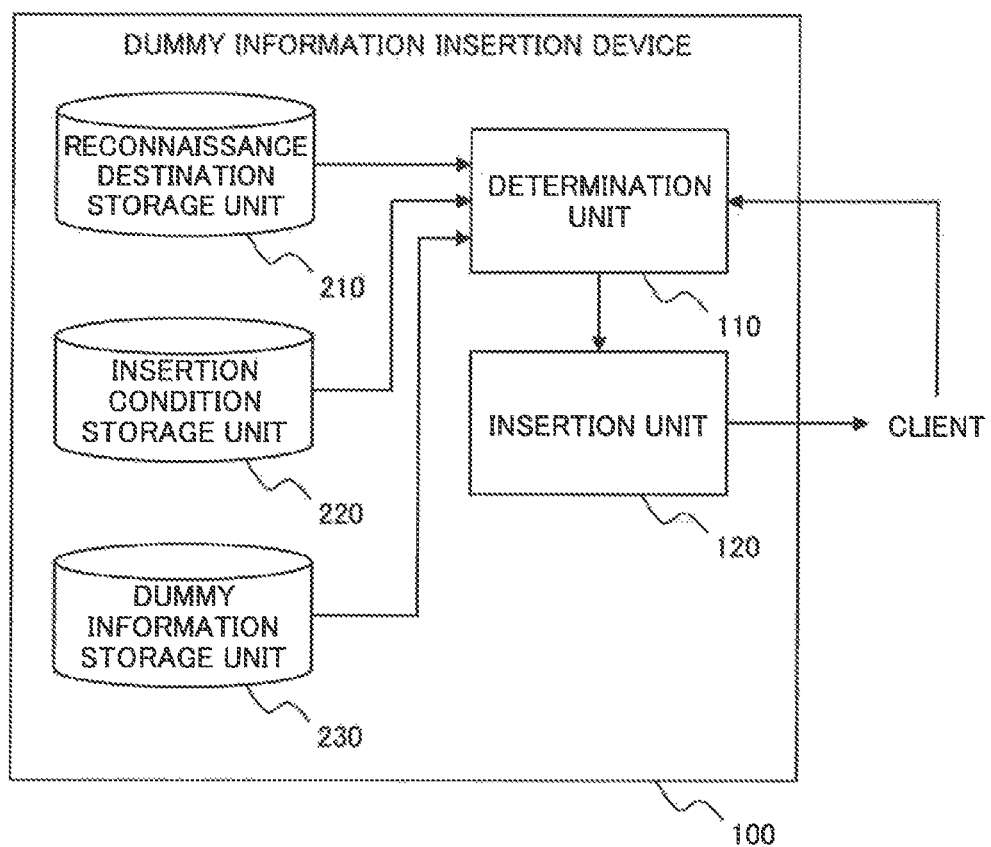
FIG. 1 is a functional block diagram representing one example of a functional configuration of a dummy information insertion device according to a first example embodiment of the present invention.

A first example embodiment of the present invention will be described in detail with reference to the drawings. FIG. 1 is a functional block diagram representing a functional configuration of a dummy information insertion device 100 according to the first example embodiment of the present invention. The dummy information insertion device 100 illustrated in FIG. 1 shows characteristic configuration of the first example embodiment of the present invention, and it is apparent that the dummy information insertion device 100 illustrated in FIG. 1 may include a member not illustrated in FIG. 1. Additionally, directions of arrows in the figure are one example only, and do not limit directions of signals between blocks. Also in other block diagrams to be referred to hereinafter, directions of arrows in the figures are similarly one example only, and do not limit directions of signals between blocks.

As shown in FIG. 1, the dummy information insertion device 100 according to the present example embodiment includes a reconnaissance destination storage unit 210, an insertion condition storage unit 220, a dummy information storage unit 230, a determination unit 110, and an insertion unit 120. Although the reconnaissance destination storage unit 210, the insertion condition storage unit 220, and the dummy information storage unit 230 are recited as different storage units in FIG. 1 for the sake of explanation, the present example embodiment is not limited thereto. The reconnaissance destination storage unit 210, the insertion condition storage unit 220, and the dummy information storage unit 230 may be achieved by storage units different from each other as shown in FIG. 1, or may be achieved by one storage unit. The reconnaissance destination storage unit 210, the insertion condition storage unit 220, and the dummy information storage unit 230 may be achieved by a storage device included in the dummy information insertion device 100, or may be achieved by a separate storage device from the dummy information insertion device 100.

The above-described reference codes in the drawings are assigned to the respective elements as one example for convenience' sake in order to support understanding, and reference codes are not construed to limit the present invention to the illustrated modes.

In the present example embodiment, information included (set) in a computer will be referred to as genuine information. And, in genuine information, information in which replacement of a set value or the like causes problems that a computer fails to operate normally, that a computer performs operation different from intended operation, and the like will be referred to as genuine information irreplaceable with dummy information. The other genuine information will be referred to as genuine information replaceable with dummy information.

Subsequently, configuration of each of the units in FIG. 1 will be described in detail. In the following, unless otherwise discriminated, an attacker will be referred to also as a virus, or an infected terminal. Hereinafter, malicious reconnaissance activity and information collection conducted by an attacker will be collectively referred to as reconnaissance activity.

(Reconnaissance Destination Storage Unit 210)

Figure 2:
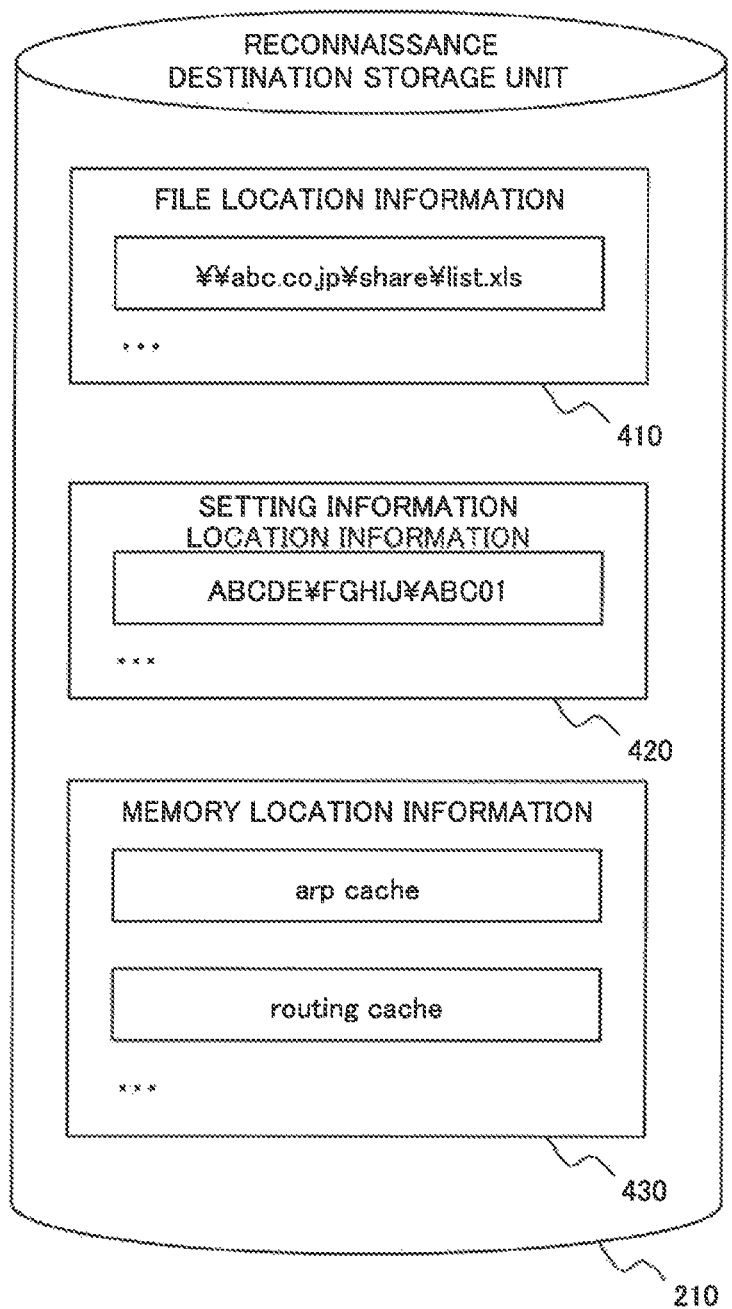
FIG. 2 is a diagram for explaining one example of information stored in a reconnaissance destination storage unit in the dummy information insertion device according to the first example embodiment of the present invention.

The reconnaissance destination storage unit 210 stores information (first location information) indicative of a location (a first location) which is highly likely to be referred to by an attacker when conducting malicious reconnaissance activity. One example of information stored in the reconnaissance destination storage unit 210 will be described with reference to FIG. 2. FIG. 2 is a diagram for explaining one example of information that is indicative of a location as a destination of reconnaissance activity (a location to be referred to in reconnaissance activity), and the information is stored in the reconnaissance destination storage unit 210 of the dummy information insertion device 100 according to the present example embodiment. The reconnaissance destination storage unit 210 stores file location information 410, setting information location information 420, and memory location information 430. Information about a location as a destination of reconnaissance activity is not limited to these pieces of information, but may include other information.

The file location information 410 is information indicative of a location on a hard disk or a memory in which a specific file is preserved. For example, the file location information 410 shown in FIG. 2 includes "¥¥abc.co.jp¥share¥list.xls" indicative of an absolute path of a location in which a file "list.xls" is preserved. Information indicative of a location of a file and included in the file location information 410 may not be an absolute path, but may be any information by which a location of a file can be uniquely specified. The file location information 410 is information indicative of, for example, a location where a history of browsing sites is stored, or the like.

Thus, the file location information 410 is information indicative of a location of at least either one of a file and a cache present on a hard disk or a memory.

The setting information location information 420 is setting information about a system or an application, or information indicative of a location in which specific attribute information is preserved. The setting information location information 420, in a case of a Windows (registered trademark) based operating system, for example, is information indicative of a location in which attribute information for a registry is preserved. The setting information location information 420 illustrated in FIG. 2 includes, for example, "ABCDE¥FGHIJ¥ABC01" indicative of an absolute path of a location in which attribute information for limiting a function of a certain application ("ABC01" in FIG. 2) is preserved.

The memory location information 430 is information indicative of a location in which specific information on a memory is preserved. The memory location information 430 shown in FIG. 2 includes, for example, "arp cache" and "routing cache". The "arp cache" indicates a location in which a result obatained by executing an arp (address resolution protocol) command (a command for displaying or setting of an arp table) is preserved. The "routing cache" indicates a location in which a result obtained by executing a route command (a command for displaying or setting of a routing table) is preserved.

As described in the foregoing, the reconnaissance destination storage unit 210 stores information that indicates a location where genuine information irreplaceable with other information (for example, dummy information), the information is at least indicative of a location in a computer, and the location is highly likely to be referred to by an attacker when conducting malicious reconnaissance activity.

(Insertion Condition Storage Unit 220)

Figure 3:
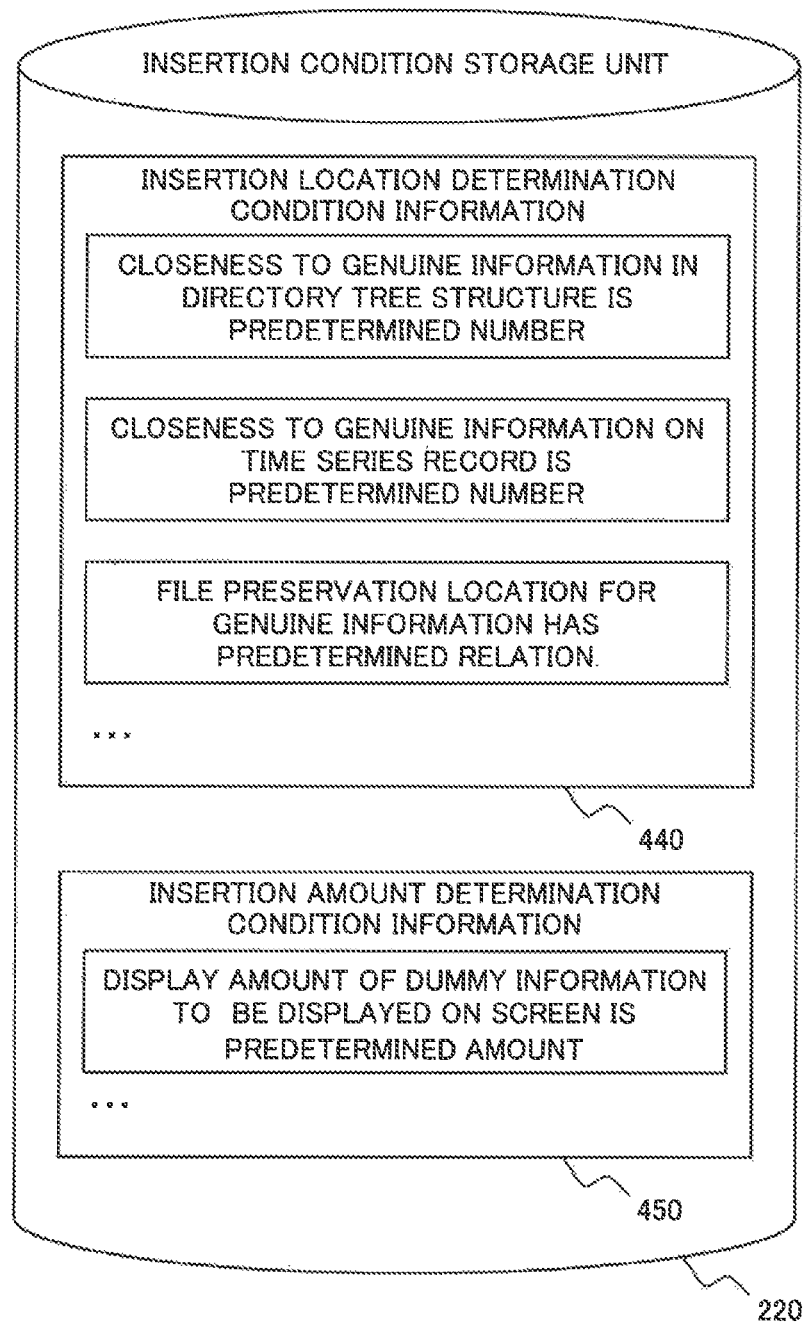
FIG. 3 is a diagram for explaining one example of information indicative of insertion conditions stored in an insertion condition storage unit in the dummy information insertion device according to the first example embodiment of the present invention.

The insertion condition storage unit 220 stores information indicative of a condition or a rule for determining a location and an amount of dummy information to be inserted. A condition or a rule for determining a location and an amount of dummy information to be inserted will be hereinafter referred to as insertion conditions. Description will be given to one example of information indicative of insertion conditions stored in the insertion condition storage unit 220 with reference to FIG. 3. FIG. 3 is a diagram for explaining one example of information indicative of insertion conditions stored in the insertion condition storage unit 220. As shown in FIG. 3, the insertion condition storage unit 220 stores insertion location determination condition information (first condition information) 440, and insertion amount determination condition information (second condition information) 450. The insertion location determination condition information 440 indicates a condition or a rule for determining a location (a second location) at which dummy information is inserted. The insertion amount determination condition information 450 indicates a condition or a rule for determining an amount of dummy information to be inserted (an insertion amount). The information indicative of insertion conditions for determining a location in which dummy information is inserted is not limited to these pieces of information, but may be other information.

The insertion location determination condition information 440 is information indicative of a condition to be satisfied or a rule to be conformed to when determination is made as to where the dummy information is inserted or arranged. The insertion location determination condition information 440 is, as shown in FIG. 3, for example, information indicative of conditions of the following (1) to (3). Conditions included as the insertion location determination condition information 440 may be one or a plurality of conditions.

(1) "Closeness to genuine information in a directory tree structure is a predetermined number",
(2) "closeness to genuine information on a time series record is a predetermined number", and
(3) "a file preservation location for genuine information has a predetermined relation".

Figure 4:
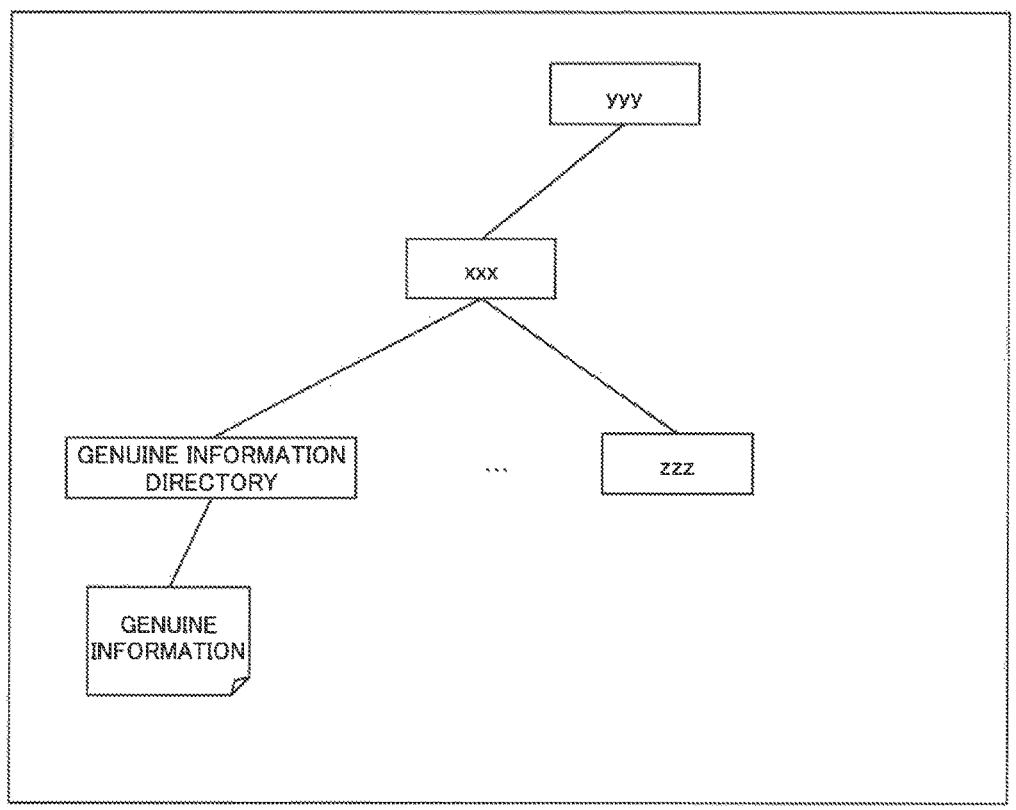
FIG. 4 is a diagram for explaining the number of hops used in the dummy information insertion device according to the first example embodiment of the present invention.

The "Closeness to genuine information in a directory tree structure" in the above (1) will be hereinafter referred to as "the number of hops". Regarding "the number of hops", description will be made with reference to FIG. 4. FIG. 4 is a diagram for explaining the number of hops in the present example embodiment. Here, a directory tree structure is a directory structure represented in a tree format.

As shown in FIG. 4, in the directory tree structure, "genuine information directory" represents a directory in which genuine information is stored. A directory (also referred to as a parent directory) one layer higher (a higher layer) than the genuine information directory is denoted as "xxx". A closeness (distance) between "xxx" and genuine information is assumed to be one hop.

Satisfying the number of hops being zero (hereinafter, denoted as "the number of hops=0") represents that a location in which dummy information is inserted is within the same directory or file (in FIG. 4, a genuine information directory) as genuine information.

Satisfying "the number of hops=1" represents that a location in which dummy information is inserted is in a directory one layer higher than the genuine information directory (parent directory) (in FIG. 4, xxx), or in a directory one layer lower (also referred to as a child directory).

Satisfying "the number of hops=2" represents that dummy information is inserted into other directory or folder present at a location one layer higer than or one layer lower than the genuine information directory. Other directory present at a location one layer higher than the genuine information directory represents other directory or folder (in FIG. 4, "zzz") present in parallel to the genuine information directory.

A case where the number of hops is three or more indicates a location where higher and lower layers are increased to the number of hops from the time when the number of hops is two.

Thus, the condition (1) is a condition that, from the directory (the first location) storing genuine information as a starting point, dummy information is inserted in a location (the second location) at a distance of the number of hops.

Although for the sake of explanation, the conditions are recited as a sentence of explanation, the condition may be a character string representing a numerical value indicative of the number of hops or indicative of a preservation location. For example, the condition (1) may be represented by a character string and a numerical value such as "the number of hops=3". The "number of hops=3" is considered as a condition that dummy information is inserted into a location having the number of hops being "3" from the directory storing genuine information as a starting point. The insertion location determination condition information 440 may be information indicative of a location where dummy information is arranged in such a case where the genuine information is used as a starting point. The condition (1) may be simply represented by a numerical value of "3".

The number of hops included in the above conditions is not limited to the number of hops between a location in which genuine information is inserted and a location in which dummy information is inserted, and may be, for example, one of the following (a) to (c):
(a) the number of hops between genuine information and dummy information,
(b) the number of hops between the genuine information and a location in which the dummy information is inserted, and
(c) the number of hops between a directory storing the genuine information and the dummy information.

In a case of (a), for example, the number of hops between the genuine information and the genuine information directory is assumed to be one. In this case, the number of hops is one or more. Accordingly, in the case of (a), when dummy information is present in the same directory as that of the genuine information, the number of hops between the genuine information and dummy information is two.

In the present example embodiment, for the sake of explanation, the number of hops is assumed to be a distance between a location in which the genuine information is inserted and a location in which the dummy information is inserted. In other words, the number of hops=0 is assumed to represent that the genuine information and the dummy information are present in the same directory.

For example, the above condition may designate a range such as "the number of hops <=3".

As described in the foregoing, the above condition (1) is a condition that positions of the genuine information and the dummy information in the file structure are within a predetermined range.

The "closeness to genuine information on a time series record" in the above (2) will be hereinafter referred to as a distance between records. In a file configured with time series records such as a log or the like, when one record in the file is displayed by one line, for example, a record-to-record distance between a record of the genuine information and a record recited in the subsequent line is considered to be "1". In such a case, the condition (2) will be a condition that a record of genuine information and a record of dummy information are apart by a record-to-record distance (a predetermined number of lines).

In the above file, in a case where one record is, for example, a text of 256 bytes, a record-to-record distance between a record of the genuine information and a text of 256 bytes subsequent to the record of the genuine information is considered to be "1". In such a case, the condition (2) will be a condition that the record of the genuine information and the record of the dummy information are apart by a predetermined record-to-record distance.

Accordingly, under the condition (2), a file (for example, the file location information 410 shown in FIG. 2), such as a log, configured with time series records will be a location (the first location) to include the genuine information. Then, in the first location, the dummy information is inserted into a location (the second location) satisfying the above condition.

Similarly to the condition (1), the condition (2) may be represented not by a sentence of explanation but by a character string and a numerical value such as "the record (or the number of lines)=3" as information indicative of a location in which dummy information is to be arranged, with genuine information as a starting point. The above condition may be a condition that designates a range such as "record <=3".

As described in the foregoing, the above condition (2) is a condition that a distance between genuine information and dummy information included in the first location is within a predetermined range.

And, "a file preservation location has a predetermined relation" in the above (3) represents, for example, a relation between places in a computer where pieces of information that are displayed by an application are preserved. In a case of an electronic mail, for example, "a file preservation location has a predetermined relation" represents a relation between a preservation location of a body of an electronic mail and a preservation location of an attached file which is attached to the electronic mail. In other words, the condition (3) is a condition that when genuine information is preserved in a preservation location (the first location) of a body of an electronic mail, a preservation location (the second location) of dummy information is a preservation location of an attached file of the electronic mail.

The insertion amount determination condition information 450 is information indicative of a condition to be satisfied or a rule to be conformed to at the time of determining an amount of dummy information to be inserted. The insertion amount determination condition information 450 can be also considered to be a condition to be satisfied at the time of causing a display device (not shown) to display dummy information. The insertion amount determination condition information 450 is, for example, as shown in FIG. 3, information indicative of a condition that "a display amount of dummy information to be displayed on a screen is a predetermined amount". This "on a screen" represents being on a screen of a client, or being on a screen of a computer that operates a client. Although for the sake of explanation, the conditions are recited as a sentence of explanation, the condition may be a numerical value indicative of a display amount.

For example, when a display amount of dummy information is represented as a rate relative to information to be displayed, a condition indicated by the insertion amount determination condition information 450 may be also represented by a character string and a numerical value such as "rate=25%". The "rate=25%" is considered to be a condition that an amount of dummy information to be displayed on a display screen is 25% of the total amount. The condition may be simply represented by a numerical value of "25".

What is displayed on the display screen may be GUI (Graphical User Interface) configured, for example, with widgets or the like.

Thus, the insertion amount determination condition information 450 is information indicative of a condition for determining an amount of dummy information to be inserted. By determining an amount of dummy information to be inserted according to the condition, the dummy information insertion device 100 is allowed to more effectively input dummy information to an attacker.

The insertion amount determination condition information 450 is preferably information indicative of a condition regarding a display amount of dummy information to be displayed on a screen. This enables the dummy information insertion device 100, by making use of visual recognition of visual information by a person (an attacker) more effectively, to input dummy information to the attacker.

Although the present example embodiment is described with respect to the case where the insertion location determination condition information 440 and the insertion amount determination condition information 450 are stored in the same storage unit (the insertion condition storage unit 220) as an example, the present example embodiment is not limited thereto. The insertion location determination condition information 440 and the insertion amount determination condition information 450 may be stored in different storage units.

(Dummy Information Storage Unit 230)

Figure 5:
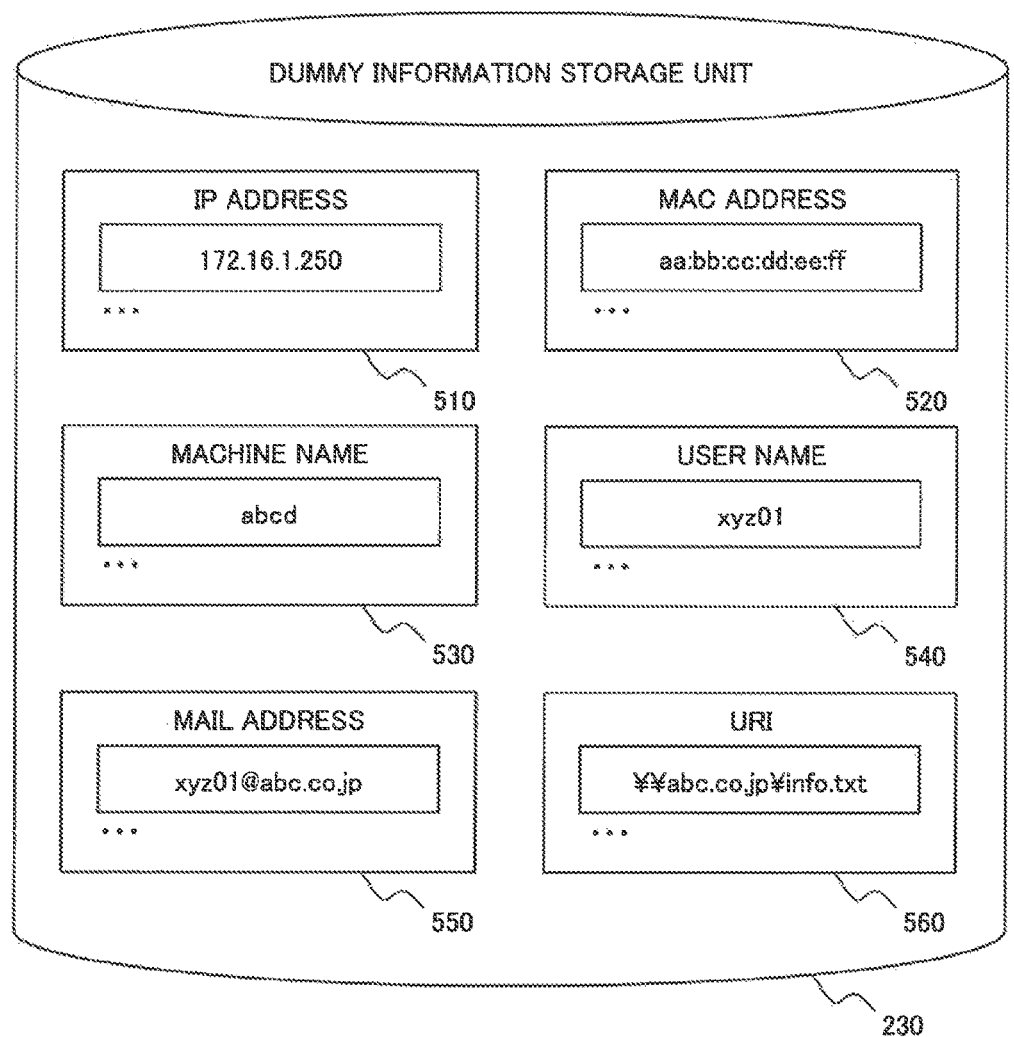
FIG. 5 is a diagram for explaining one example of dummy information stored in a dummy information storage unit in the dummy information insertion device according to the first example embodiment of the present invention.

The dummy information storage unit 230 stores dummy information to be inserted into a determined location. The dummy information is information wchih is similar to genuine information and not present within a computer and a local network to which the computer is connected. In genuine information, at least information similar to genuine information irreplaceable with dummy information is stored as dummy information in the dummy information storage unit 230. One example of information stored by the dummy information storage unit 230 will be described with reference to FIG. 5. FIG. 5 is a diagram for explaining one example of dummy information stored in the dummy information storage unit 230. The dummy information storage unit 230 stores, for example, the following (A) to (F) as dummy information as shown in FIG. 5:

(A) an IP (Internet Protocol) address 510,
(B) a MAC (Media Access Control) address 520,
(C) a machine name 530,
(D) a user name 540,
(E) a mail address 550, and
(F) a URI (Uniform Resource Identifier) 560.

As shown in FIG. 5, the IP address 510 is a dummy IP address of, for example, "172.16.1.250". Replacing an IP address set to a client with other (dummy) IP address disables the client from communicating. Therefore, an IP address of a client can be considered to be irreplaceable genuine information. Thus, the dummy information stored in the dummy information storage unit 230 is similar to genuine information irreplaceable with dummy information as shown in FIG. 5.

The MAC address 520 is a dummy MAC address of, for example, "aa:bb:cc:dd:ee:ff".

The machine name 530 is a dummy machine name (computer name) of, for example, "abcd". The machine name 530 may be a host name.

The user name 540 is a dummy user name (account) of, for example, "xyz01".

The mail address 550 is a dummy mail address of, for example, "xyz01@abc.co.jp".

The URI 560 is a dummy URI of, for example, "¥¥abc.co.jp¥info.txt".

A kind of dummy information is not limited to these kinds but may be other kind.

(Determination Unit 110)

The determination unit 110 determines a location and an amount of dummy information, which is stored in the reconnaissance destination storage unit 210, to be inserted by using information indicative of a location as a destination of reconnaissance activity, and a condition, which is stored in the insertion condition storage unit 220, for determining a location and an amount of dummy information to be inserted. The determination unit 110 determines which dummy information is to be inserted from the dummy information storage unit 230.

Figure 6:
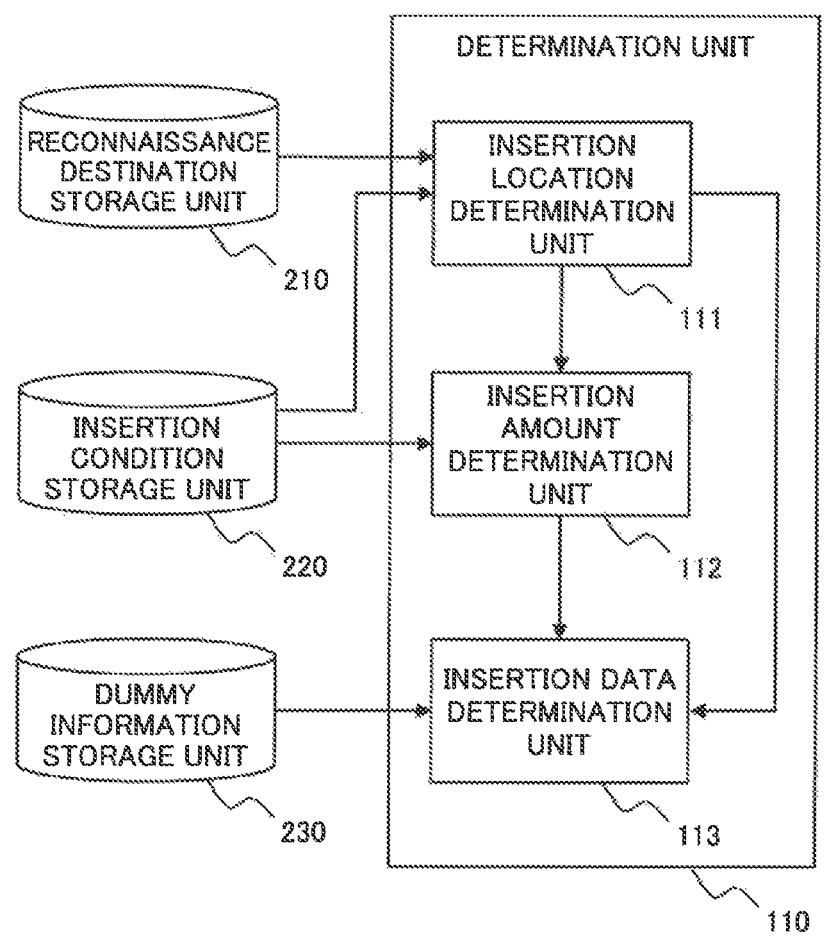
FIG. 6 is a functional block diagram showing one example of a functional configuration of a determination unit in the dummy information insertion device according to the first example embodiment of the present invention.

FIG. 6 is a functional block diagram showing a functional configuration of the determination unit 110 according to the present example embodiment. As shown in FIG. 6, the determination unit 110 includes an insertion location determination unit 111, an insertion amount determination unit 112, and an insertion data determination unit 113.

In the following, description will be made of determination, by the insertion location determination unit 111 of the determination unit 110, of a location in which dummy information is inserted using the setting information location information 420 in the information stored in the reconnaissance destination storage unit 210, and the insertion location determination condition information 440 stored in the insertion condition storage unit 220. The setting information location information 420 is assumed to be "ABCDE¥FGHIJ¥ABC01" shown in FIG. 2. The insertion location determination condition information 440 is assumed to be information indicative of a condition that "closeness to genuine information in a directory tree structure is 0".

The insertion location determination unit 111 determines a location satisfying the insertion location determination condition information 440 as a location in which dummy information is to be inserted (referred to also as an insertion location or an insertion destination). In the present example, since closeness to genuine information in a directory tree structure (hereinafter referred to as the number of hops) is 0, the insertion location determination unit 111 determines a location in which the dummy information is to be inserted to be the same location as that of the genuine information.

Although in the above-described example, the insertion location determination unit 111 determines a location in which dummy information is to be inserted using only "ABCDE¥FGHIJ¥ABC01" in information stored in the reconnaissance destination storage unit 210, the present example embodiment is not limited thereto. The insertion location determination unit 111 may select some of a plurality of locations indicated by the information stored in the reconnaissance destination storage unit 210, and may determine a location in which dummy information is to be inserted for each of the selected locations. When an administrator determines in advance an insertion destination of dummy information, the insertion location determination unit 111 may select in advance the insertion destination, and may determine the selected insertion destination as a location in which dummy information is to be inserted. The insertion location determination unit 111 may determine locations in which dummy information is to be inserted for all of a plurality of locations indicated by the information stored in the reconnaissance destination storage unit 210.

Description will be made of a case, for example, where the insertion location determination condition information 440 stored in the insertion condition storage unit 220 is stored in association to each OS (Operating System). In this case, the insertion location determination unit 111 may acquire information of OS of a client from the client, and determine a location in which dummy information is to be inserted using the insertion location determination condition information 440 associated with the acquired OS information.

Description will be made of a case, for example, where the insertion location determination condition information 440 stored in the insertion condition storage unit 220 is information indicative of a condition which is related to a file (for example, the file location information 410 shown in FIG. 2), such as a log, including time series records. In other words, the insertion location determination condition information 440 is assumed to be information indicating that "closeness to genuine information on a time series record is a predetermined number" shown in FIG. 3.

At this time, the insertion location determination unit 111 determines, as an insertion destination, a location satisfying the condition that closeness to genuine information in a file (the first location) including the genuine information is a predetermined number. In this case, the insertion destination will be a location in a file including the genuine information.

The insertion location determination unit 111 supplies information indicative of the determined insertion location (insertion destination information) to the insertion amount determination unit 112 and the insertion data determination unit 113.

Next, description will be made of determination, by the insertion amount determination unit 112 of the determination unit 110, of an amount of dummy information to be inserted using the insertion location determined by the insertion location determination unit 111 and the insertion amount determination condition information 450 stored in the insertion condition storage unit 220. Here, the insertion amount determination condition information 450 is assumed to be information indicative of a condition that "a display amount of dummy information to be displayed on a screen is 25% of the total amount".

The insertion amount determination unit 112 determines an amount satisfying the insertion amount determination condition information 450 as an amount of dummy information to be inserted (referred to also as an insertion amount). First, the insertion amount determination unit 112 determines whether a location indicated by the insertion destination information is a location, such as a folder or a directory, where a file or information is stored, or a location in a file such as a log.

Then, when a location indicated by the insertion destination information is a location such as the folder or the directory, the insertion amount determination unit 112 acquires, from a client, how many kinds of set values (setting information) are stored in the location indicated by the insertion destination information. Here, a total of nine set values are assumed to be stored in "ABCDE¥FGHIJ¥ABC01". Then, from the client, the insertion amount determination unit 112 acquires how many of these set values are to be displayed when displaying these set values on a screen. In this example, it is assumed that all (nine) set values are to be displayed on the screen. The insertion amount determination unit 112 acquires the number (nine) of these set values from the client. The set value of nine is genuine information.

Then, the insertion amount determination unit 112 calculates dummy information of an amount satisfying the condition that "a display amount of dummy information to be displayed on a screen is 25% of the total amount". Assuming that the number of dummy information is represented as x, the insertion amount determination unit 112 calculates x which satisfies $(9+x) \times 25\% = x$. As a result, x=3 is obtained. Then, the insertion amount determination unit 112 determines whether all of nine pieces of genuine information and three pieces of dummy information are displayed on the screen, and when all pieces of information are to be displayed, determines that an amount of dummy information satisfying the condition that "a display amount of dummy information to be displayed on a screen is 25% of the total amount" is three.

Description will be made of a case, for example, where the insertion amount determination condition information 450 is a condition that "a display amount of dummy information to be displayed on a screen is 25% of the amount of genuine information" and an amount (the number) of kinds (e.g. the above-described set values) of genuine information is eight. In this case, the insertion amount determination unit 112 finds an amount of dummy information to be inserted which satisfies the above condition by calculating $8 \times 25\% = two$ (number).

Description will be made of a case where a location indicated by the insertion destination information is a location in a file such as a log. At this time, as described above, an insertion destination (the second location) is in the file (in the first location). First, the insertion amount determination unit 112 acquires, from the client, how many kinds of pieces of genuine information are present when the file is displayed such that a location indicated by the insertion destination is included. Then, the insertion amount determination unit 112 calculates an amount of dummy information to be inserted such that the condition indicated by the insertion amount determination condition information 450 is satisfied.

Then, the insertion amount determination unit 112 supplies information indicative of the determined insertion amount (insertion amount information) to the insertion data determination unit 113.

Figure 7:
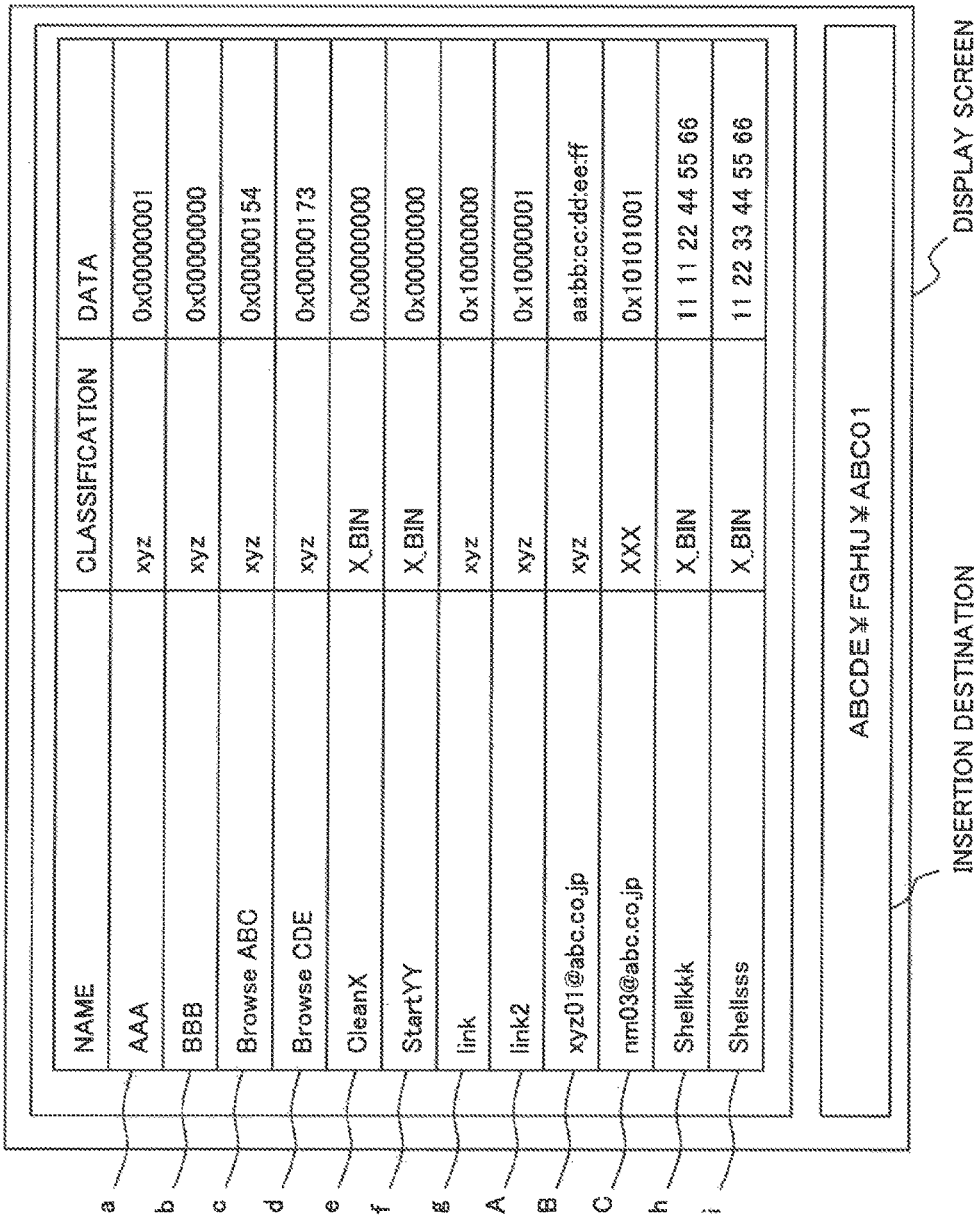
FIG. 7 is a diagram for explaining operation of the determination unit in the dummy information insertion device according to the first example embodiment of the present invention.

Next, description will be made of determination, by the insertion data determination unit 113 of the determination unit 110, of dummy information to be inserted using dummy information stored in the dummy information storage unit 230. Dummy information which is determined by the insertion data determination unit 113 and is adapted to an insertion format will be hereinafter referred to as insertion data in order to discriminate it from the dummy information stored in the dummy information storage unit 230. This will be described with reference to FIG. 7. FIG. 7 is a diagram for explaining operation of the insertion data determination unit 113 of the determination unit 110. FIG. 7 shows one example of genuine information and dummy information displayed on the screen. It is assumed in FIG. 7 that a location (an insertion destination) in which dummy information is inserted and which is determined by the insertion location determination unit 111 is "ABCDE¥FGHIJ¥ABC01". Although in FIG. 7, only information for use in the following description is illustrated, it is apparent that other information may be displayed on the screen.

In FIG. 7, each of the lines indicated by codes a to i is a piece of genuine information. In FIG. 7, each of the lines includes a set of (name, classification, and data). For example, a line of the code a is genuine information including a set of (AAA, xyz, 0x00000001). A name shown in FIG. 7 uniquely specifies setting information, and a kind of set value represents the name.

First, the insertion data determination unit 113 acquires, from the client, a set value (setting information) and a format thereof which are stored in a location indicated by the insertion destination information. As described above, the location indicated by the insertion destination information includes genuine information of a set of (name, classification, and data).

Then, the insertion data determination unit 113 determines which dummy information is to be inserted from the dummy information storage unit 230. The insertion data determination unit 113 determines, for example, the following (A) to (C):
(A) "name" is the mail address 550 stored in the dummy information storage unit 230,
(B) "classification" is the one most frequently appears among classifications in other lines ("xyz" in FIG. 7), and
(C) "data" is the MAC address 520 stored in the dummy information storage unit 230.

Then, the insertion data determination unit 113 determines to insert a set of (xyz01@abc.co.jp, xyz, aa:bb:cc:dd:ee:ff). Thus, the insertion data determination unit 113 determines insertion data.

The insertion data determination unit 113 may determine insertion data after confirming that the insertion data is not used in a client into which insertion data is to be inserted and other client within a local network connected with the client.

The insertion data determination unit 113 may select dummy information included in the insertion data at random or according to a predetermined rule. A method of selecting dummy information is not particularly limited.

The insertion data determination unit 113 may acquire a set value (setting information) itself or a kind of set value stored in a location indicated by insertion destination information from the client, and may determine a value approximate to the set value as dummy information to be inserted (insertion data).

A method for the determination will be described. For example, the insertion data determination unit 113 acquires a kind (name) and a value (data) of an arbitrary set value from a location shown in FIG. 7. It is assumed, for example, that the insertion data determination unit 113 acquires "link" in the line of the code g as a kind of a set value. The insertion data determination unit 113 determines, for example, the following (A) to (C) as dummy information for this "link":
(A) "name" is "link2" that is a number subsequent to "link",
(B) "classification" is the one most frequently appears among classifications in other lines ("xyz" in FIG. 7), and
(C) "data" is "0x10000001" that is a number subsequent to "0x10000000" which is data associated with "link".

Then, the insertion data determination unit 113 determines to insert a set of (link2, xyz, 0x10000001). Thus, the insertion data determination unit 113 may generate insertion data using subsequent numbers, analogous words, or the like.

As described in the foregoing, the insertion data determination unit 113 determines dummy information to be inserted on the basis of genuine information included in an insertion destination. The insertion data determination unit 113 may determine dummy information to be inserted on the basis of genuine information included in a location (the first location) indicated by the reconnaissance destination storage unit 210.

Description will be made of a case, for example, where the reconnaissance destination storage unit 210 includes a directory (a first directory) in which a set value (genuine information) is stored, and an insertion destination is another directory (a second directory). At this time, the insertion data determination unit 113 may determine dummy information on the basis of a set value of the first directory.

It is assumed, for example, that the reconnaissance destination storage unit 210 includes a log file storing genuine information, and an insertion destination is a line within a predetermined range in the log file. It is assumed, for example, that the insertion destination is from the fifth line to the tenth line of the log file. At this time, the insertion data determination unit 113 may determine insertion data (dummy information) on the basis of genuine information included in the fifth line to the tenth line (the second location) in the log file. The insertion data determination unit 113 may determine insertion data (dummy information) on the basis of genuine information included in the entire log file (the first location).

Thus, the insertion data determination unit 113 determines insertion data on the basis of at least either one of genuine information included in a location indicated by information stored in the reconnaissance destination storage unit 210 and genuine information included in an insertion destination. This enables the dummy information insertion device 100 to insert dummy information that is not easy to be identified as dummy information by an attacker.

The insertion data determination unit 113 may acquire a kind (name) and a value (data) of an arbitrary set value from a location shown in FIG. 7, performs comparison with dummy information stored in the dummy information storage unit 230, and then determine, as insertion data, dummy information closer to genuine information.

At this time, the insertion data determination unit 113 preferably determines insertion data whose amount is not less than an insertion amount determined by the insertion amount determination unit 112.

Then, the determination unit 110 supplies, to the insertion unit 120, insertion destination information indicative of a location in which dummy information is to be inserted and which is determined by the insertion location determination unit 111, insertion amount information indicative of an amount, which is determined by the insertion amount determination unit 112, of dummy information to be inserted, and insertion data determined by the insertion data determination unit 113. The insertion destination information, insertion amount information and insertion data output by the determination unit 110 will be collectively referred to also as insertion information.

Although the insertion amount determination unit 112 of the determination unit 110 determines an amount of dummy information to be inserted by using the insertion amount determination condition information 450, the present example embodiment is not limited thereto. The insertion amount determination unit 112 may determine an amount of dummy information to be inserted at random. When an insertion amount of dummy information is large, while an attacker is more likely to use dummy information, the attacker is more likely to identify the information as dummy. Therefore, the insertion amount determination unit 112 preferably determines an amount such that an attacher does not identify the information as dummy. Accordingly, the insertion amount determination condition information 450 is preferably information indicative of such a condition which enables determining an amount of dummy information that makes a possibility of being identified as dummy low and makes a possibility of being used by the attacker high.

(Insertion Unit 120)

The insertion unit 120 receives, from the determination unit 110, insertion destination information, insertion amount information, and insertion data. Then, the insertion unit 120 inserts insertion data in an amount indicated by insertion amount information into a location, indicated by the received insertion destination information, in a client.

As a result, insertion data indicated by the codes A to C in FIG. 7 is inserted. Insertion data may be inserted into any position on the screen. Since in FIG. 7, a set of (link2, xyz, 0x10000001) indicated by the code A is generated using values in the line of the code g, insertion data of the codes A to C is inserted under the line of the code g.

Although the description is made of determination of insertion data by the insertion data determination unit 113 of the determination unit 110, the insertion data determination unit 113 may be provided in the insertion unit 120. More specifically, the insertion unit 120 may determine insertion data with reference to the dummy information storage unit 230 using an insertion destination and an insertion amount determined by the determination unit 110, and insert the determined insertion data into the insertion destination.

(Processing Flow of Dummy Information Insertion Device 100)

Figure 8:
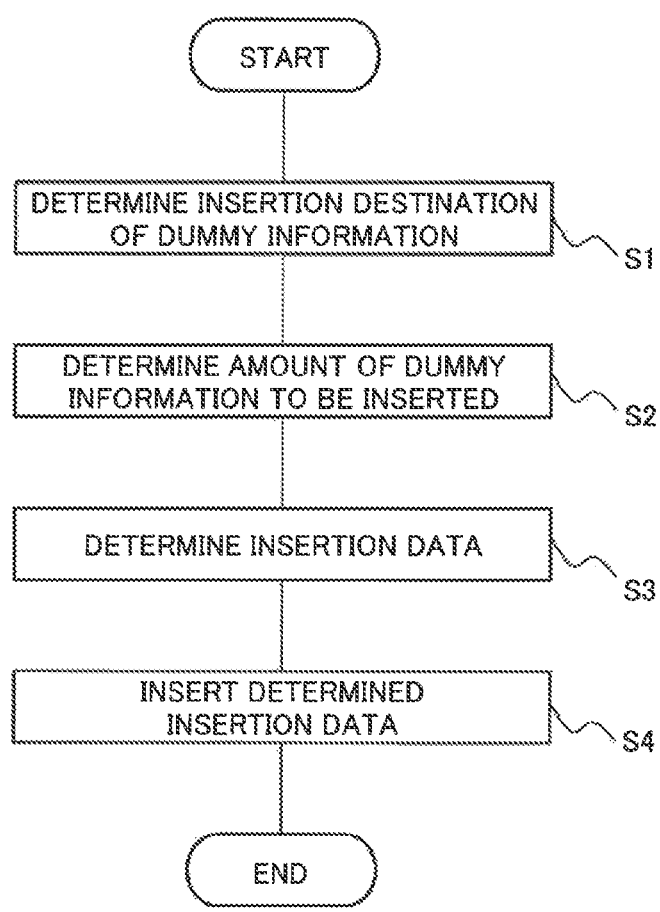
FIG. 8 is a flow chart showing one example of a processing flow of the dummy information insertion device according to the first example embodiment of the present invention.

Next, with reference to FIG. 8, description will be made of a processing flow of the dummy information insertion device 100. FIG. 8 is a flow chart showing one example of a processing flow of the dummy information insertion device 100 according to the present example embodiment.

As shown in FIG. 8, the insertion location determination unit 111 of the determination unit 110 in the dummy information insertion device 100 determines a location in which dummy information is to be inserted (insertion destination) (Step S1). Then, the insertion amount determination unit 112 of the determination unit 110 determines an amount of dummy information to be inserted (Step S2). Thereafter, the insertion data determination unit 113 of the determination unit 110 determines dummy information to be inserted (insertion data) (Step S3). Step S3 may be performed in parallel with Step S2 or in a reverse order.

Then, the insertion unit 120 inserts the insertion data in an amount (number) determined by the insertion amount determination unit 112 into the insertion destination, determined by the insertion location determination unit 111, on the client, the insertion data being determined by the insertion data determination unit 113 (Step S4).

Then the dummy information insertion device 100 ends the processing of inserting dummy information. And, the dummy information insertion device 100 performs the processing shown in FIG. 8 for each client.

(Effect)

As described in the foregoing, in the dummy information insertion device 100 according to the present example embodiment, the determination unit 110 determines an insertion destination using information, stored in the reconnaissance destination storage unit 210, indicative of a location, and information indicative of a condition for determining an insertion destination. Then, the insertion unit 120 inserts dummy information in the determined insertion destination.

As above, irrespective of whether genuine information of a computer (client) is replaceable with dummy information, the dummy information insertion device 100 inserts the dummy information in a location close to the genuine information visually and in displaying.

This enables dummy information together with genuine information to be caught by an attacker's eye during reconnaissance activity of a virus, in particular, when an attacker visually checks information using a tool having GUI or the like. Thus, it is possible to input dummy information to an attacker who tries to collect genuine information irreplaceable with dummy information.

Accordingly, when an attacker with dummy information input thereto recognizes information without discriminating between genuine information and dummy information to spread infection using the dummy information, an attack of the infection spread can be detected.

Thus, the dummy information insertion device 100 according to the present example embodiment enables input of dummy information to an attacker by utilizing visual recognition of visual information by a person (attacker) more effectively.

Additionally, information indicative of a condition for determining an insertion destination is the above insertion location determination condition information 440, and according to this condition, the determination unit 110 determines an insertion destination. This enables dummy information to be more effectively inserted into a location which is highly likely to be attacked by an attacker.

Additionally, the reconnaissance destination storage unit 210 stores at least information that is indicative of a location which is in a computer and is highly likely to be referred to by an attacker during execution of malicious reconnaissance activity, and is indicative of a location in which genuine information irreplaceable with other information is included. This enables dummy information to be more effectively inserted into a location which is highly likely to be attacked by an attacker.

Second Example Embodiment

Subsequently, a second example embodiment of the present invention will be described. A dummy information insertion system of the present example embodiment is equivalent to the above dummy information insertion system of the first example embodiment with operation thereof modified. In the present example embodiment, description of equivalent components as those of the above first example embodiment will be omitted and description will be made mainly of new components and operation thereof.

Figure 9:
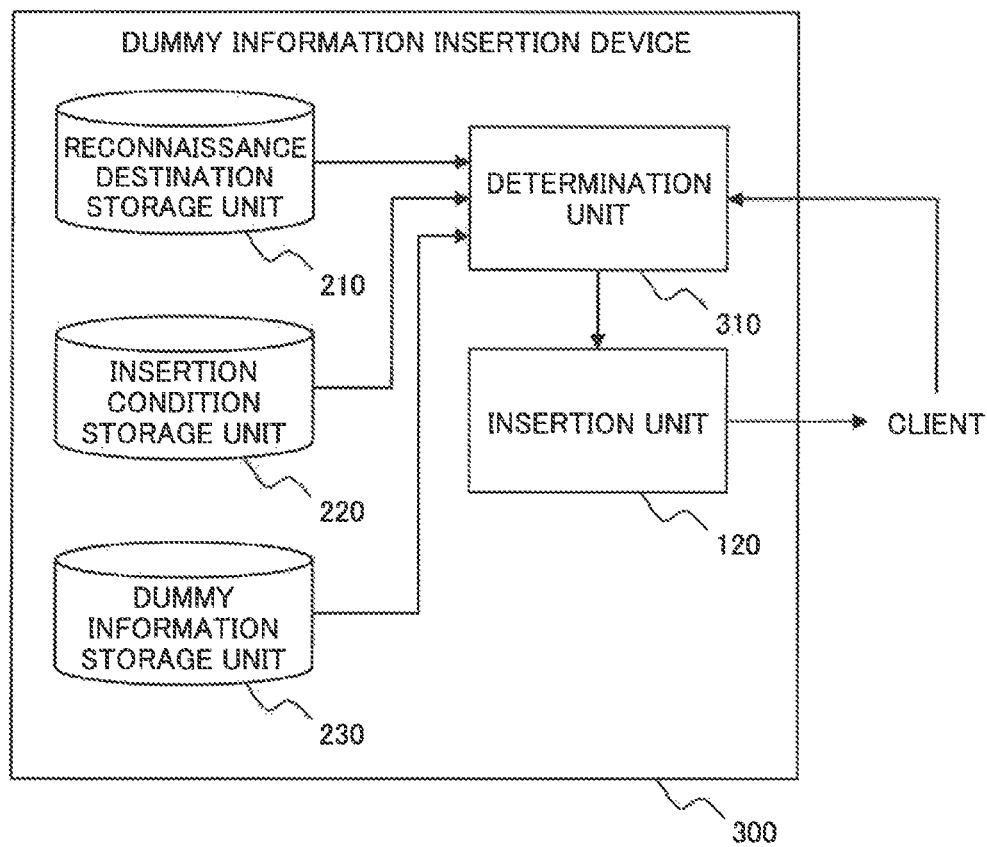
FIG. 9 is a functional block diagram representing one example of a functional configuration of a dummy information insertion device according to a second example embodiment of the present invention.

FIG. 9 is a functional block diagram showing one example of a functional configuration of a dummy information insertion device 300 according to the present example embodiment. As shown in FIG. 9, the dummy information insertion device 300 according to the present example embodiment includes a reconnaissance destination storage unit 210, an insertion condition storage unit 220, a dummy information storage unit 230, a determination unit 310, and an insertion unit 120. The dummy information insertion device 300 according to the present example embodiment has a configuration in which the determination unit 110 in the dummy information insertion device 100 according to the first example embodiment is replaced with the determination unit 310.

Similarly to the first example embodiment, the reconnaissance destination storage unit 210 stores information indicative of a location that is highly likely to be referred to by an attacker during execution of malicious reconnaissance activity, and is indicative of a location in which genuine information irreplaceable with dummy information is included. The reconnaissance destination storage unit 210 may further store information indicative of a location that is highly likely to be referred to by an attacker during execution of malicious reconnaissance activity, and is indicative of a location including only genuine information replaceable with dummy information.

Figure 10:
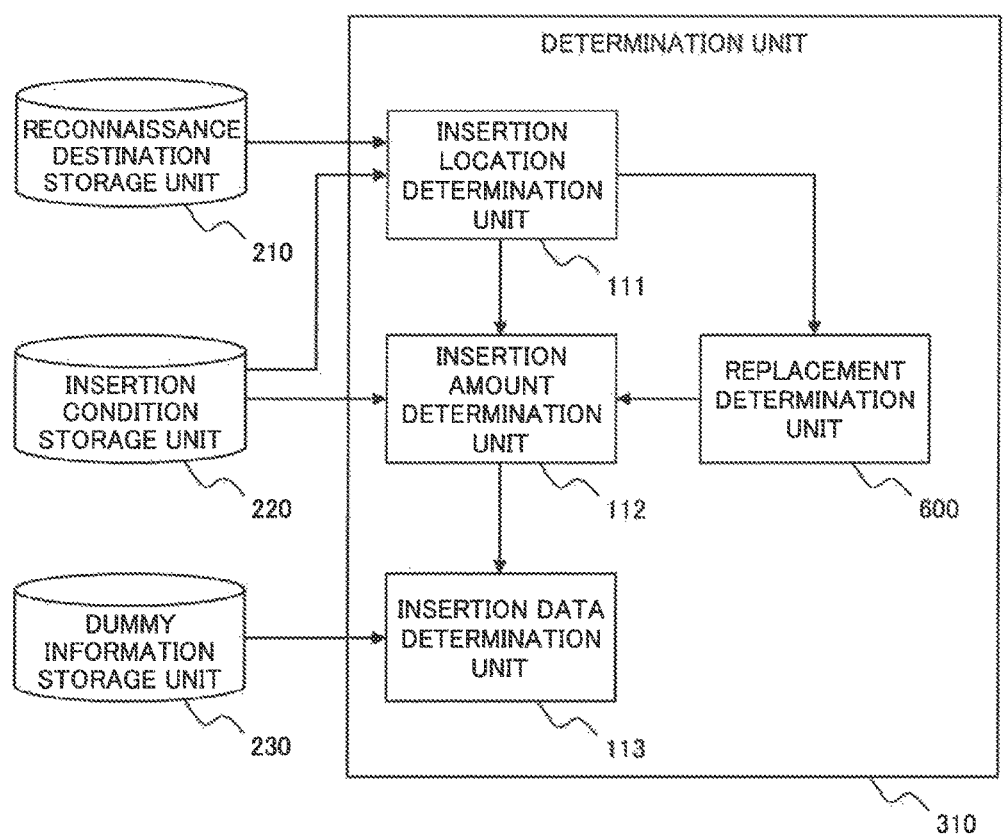
FIG. 10 is a functional block diagram representing one example of a functional configuration of a determination unit in the dummy information insertion device according to the second example embodiment of the present invention.

Next, the determination unit 310 will be described with reference to another drawing. FIG. 10 is a functional block diagram showing one example of a functional configuration of the determination unit 310 in the dummy information insertion device 300 according to the present example embodiment. As shown in FIG. 10, the determination unit 310 includes an insertion location determination unit 111, an insertion amount determination unit 112, an insertion data determination unit 113, and a replacement determination unit 600. The determination unit 310 is equivalent to the determination unit 110 according to the first example embodiment with the replacement determination unit 600 further included.

Similarly to the insertion location determination unit 111 according to the first example embodiment, the insertion location determination unit 111 determines an insertion destination of dummy information with reference to the reconnaissance destination storage unit 210 and the insertion condition storage unit 220. Then, the insertion location determination unit 111 supplies the insertion destination information indicative of the determined insertion destination to the insertion amount determination unit 112, the insertion data determination unit 113 and the replacement determination unit 600.

The replacement determination unit 600 receives the insertion destination information from the insertion location determination unit 111. Then, with respect to each insertion destination indicated by the insertion destination information, the replacement determination unit 600 determines whether genuine information included in the insertion destination is replaceable with dummy information. The replacement determination unit 600 may determine whether the genuine information is replaceable with the dummy information by, for example, executing writing to or change of genuine information to determine whether it is possible or not, or by other method. Then, the replacement determination unit 600 outputs a determination result to the insertion amount determination unit 112.

The determination result includes information indicative of, for example, the following (A) to (C):
(A) all genuine information included in an insertion destination is replaceable,
(B) a part of genuine information included in the insertion destination is replaceable, and
(C) all genuine information included in the insertion destination is irreplaceable.

In a case of the above (B), the replacement determination unit 600 outputs, as a determination result, information indicative of the above (B) with information indicative of replaceable genuine information or information indicative of irreplaceable genuine information included. At this time, the replacement determination unit 600 may output, as a determination result, information indicative of the above (B) with an amount (number) of replaceable genuine information or an amount (number) of irreplaceable genuine information included.

In a case of the above (A), the replacement determination unit 600 may output, as a determination result, information indicative of the above (A) with information indicative of replaceable genuine information included. Similarly, in a case of the above (C), the replacement determination unit 600 may output, as a determination result, information indicative of the above (C) with information indicative of irreplaceable genuine information included.

The insertion amount determination unit 112 determines an amount satisfying insertion amount determination condition information 450 as an amount of dummy information to be inserted (insertion amount) or an amount to be replaced with dummy information (replacement amount) according to the determination result supplied from the replacement determination unit 600.

It is assumed, for example, that the determination result of the replacement determination unit 600 is (A) all genuine information included in an insertion destination is replaceable, and the insertion amount determination condition information 450 is information indicative of a condition that "a display amount of dummy information to be displayed on a screen is 25% of the total amount".

At this time, the insertion amount determination unit 112 acquires an amount of genuine information stored in a location indicated by insertion destination information from the client. In a case, for example, when the amount of the genuine information is eight and all is to be displayed on the screen, the insertion amount determination unit 112 calculates that an amount (number) of the dummy information is two because 8×0.25=2. Then, the insertion amount determination unit 112 determines that the calculated amount (number) of the dummy information is an amount of the genuine information to be replaced with the dummy information.

In a case, for example, when the determination result of the replacement determination unit 600 is (B) a part of the genuine information included in the insertion destination is replaceable, an amount (number) of the dummy information is calculated similarly to a case where the determination result of the replacement determination unit 600 is (A). Then, when the calculated amount is not more than the amount of replaceable genuine information, the insertion amount determination unit 112 determines an amount of the genuine information to be replaced with the dummy information to become the calculated amount (number) of the dummy information. When the calculated amount exceeds the amount of replaceable genuine information, the insertion amount determination unit 112 determines an amount (replacement amont) of the genuine information to be replaced with the dummy information to become the calculated amount (number) of the dummy information, and further, newly calculates and determines an insertion amount of the dummy information such that the insertion amount determination condition information 450 is satisfied.

In a case, for example, when the determination result of the replacement determination unit 600 is that all the genuine information included in the insertion destination is irreplaceable, the insertion amount determination unit 112 performs the same processing as that of the insertion amount determination unit 112 of the determination unit 110 according to the above-described first example embodiment.

The insertion amount determination unit 112 may determine an insertion amount similarly to the insertion amount determination unit 112 in the first example embodiment irrespective of a determination result of the replacement determination unit 600. The insertion amount determination unit 112 may at random determine an amount of dummy information to be inserted similarly to the insertion amount determination unit 112 in the above-described first example embodiment.

By the same processing as that of the first example embodiment, the insertion data determination unit 113 determines dummy information to be inserted into an insertion destination, or dummy information to replace genuine information in the insertion destination. Hereinafter, dummy information to be inserted or to replace will be referred to as insertion data.

Then, the determination unit 310 associates the following (1) to (4) with each other, and supplies them as insertion information to the insertion unit 120:

(1) insertion destination information that is indicative of a location in which dummy information is to be inserted and is determined by the insertion location determination unit 111, (2) insertion amount information that is indicative of an insertion amount and/or a replacement amount, determined by the insertion amount determination unit 112, of dummy information determined by the insertion amount determination unit 112, (3) insertion data determined by the insertion data determination unit 113, and (4) a determination result of the replacement determination unit 600.

The insertion unit 120 receives the above (1) to (4) from the determination unit 310. Then, the insertion unit 120 inserts insertion data into the insertion destination determined by the insertion location determination unit 111 and/or replaces the genuine information of the insertion destination with the insertion data on the basis of the determination result. At this time, the insertion unit 120 inserts insertion data by an insertion amount indicated by the insertion amount information and/or performs replacement by a replacement amount indicated by the insertion amount information.

In a case, for example, when a determination result is (A) all genuine information included in an insertion destination is replaceable, the insertion unit 120 replaces the genuine information of the insertion destination determined by the insertion location determination unit 111 with the insertion data. At this time, the insertion unit 120 replaces, with the insertion data, the genuine information by a replacement amount indicated by the insertion amount information.

In a case, for example, when the determination result is (B) a part of the genuine information included in the insertion destination is replaceable, the insertion unit 120 replaces, with the insertion data, the genuine information of the insertion destination determined by the insertion location determination unit 111. At this time, the insertion unit 120 replaces, with the insertion data, the genuine information by a replacement amount indicated by the insertion amount information. Further, when the insertion amount is indicated by the insertion amount information, the insertion unit 120 inserts the insertion data into the insertion destination determined by the insertion location determination unit 111.

In a case, for example, when the determination result is (C) all genuine information included in the insertion destination is irreplaceable, the insertion unit 120 inserts the insertion data in an amount indicated by the insertion amount information into the insertion destination determined by the insertion location determination unit 111 similarly to the insertion unit 120 in the first example embodiment.

Although the description is made with respect to an example where the replacing processing of replacing genuine information with dummy information is performed by the insertion unit 120, the present example embodiment is not limited thereto. The replacing processing may be performed by other components. The replacing processing may be performed by the replacement determination unit 600, or may be performed by both units, i.e., the insertion unit 120 and the replacement determination unit 600.

(Processing Flow of Dummy Information Insertion Device 300)

Figure 11:
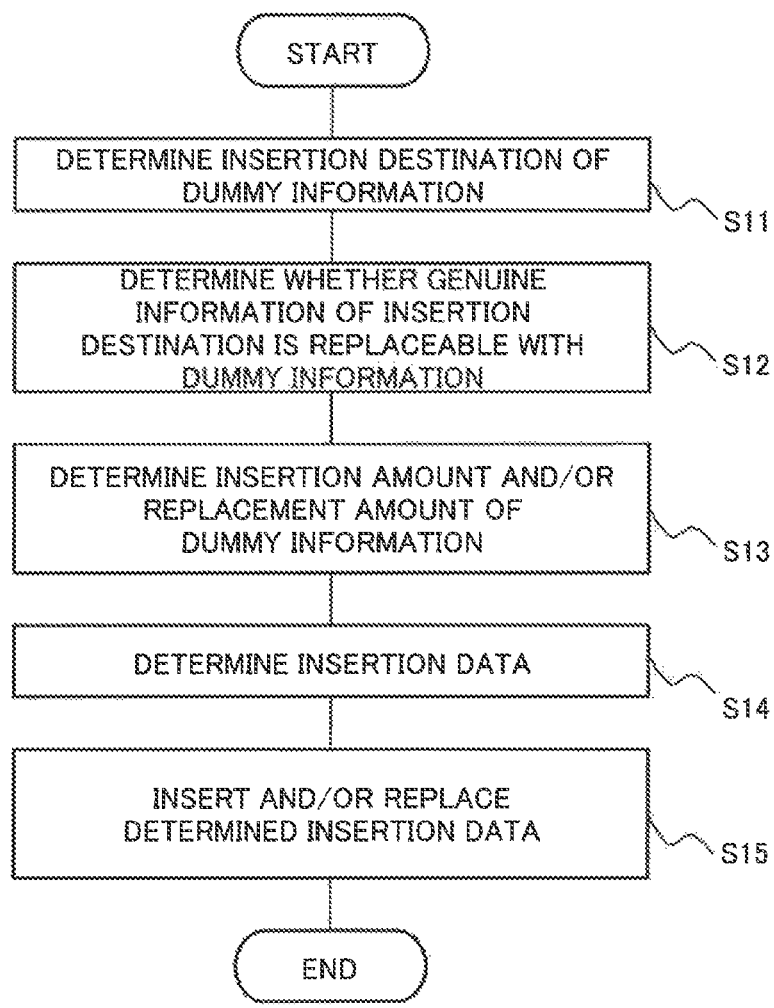
FIG. 11 is a flow chart representing one example of a processing flow of the dummy information insertion device according to the second example embodiment of the present invention.

Next, with reference to FIG. 11, a processing flow of the dummy information insertion device 300 will be described. FIG. 11 is a flow chart showing one example of a processing flow of the dummy information insertion device 300 according to the present example embodiment. As shown in FIG. 11, the insertion location determination unit 111 of the determination unit 310 of the dummy information insertion device 300 determines a location in which dummy information is to be inserted or a location in which replacement with dummy information is performed (Step S11). Hereinafter, a location in which dummy information is to be inserted and a location in which replacement with dummy information is performed will be collectively referred to as insertion destinations.

Then, the replacement determination unit 600 of the determination unit 310 determines whether genuine information included in the insertion destination is replaceable with dummy information (Step S12). Thereafter, the insertion amount determination unit 112 of the determination unit 310 determines an insertion amount and/or a replacement amount of the dummy information (Step S13).

Thereafter, the insertion data determination unit 113 of the determination unit 310 determines insertion data (Step S14). When more data usable as insertion data is present than the above insertion amount and/or replacement amount, Step S14 may be performed in paralell with Step S13 or may be performed in a reverse order.

Then, the insertion unit 120 inserts the insertion data, determined by the insertion data determination unit 113, in an amount (number), determined by the insertion amount determination unit 112, at the insertion destination, determined by the insertion location determination unit 111, on the client. Further, or alternatively, the insertion unit 120 replaces, with the insertion data determined by the insertion data determination unit 113, genuine information of the insertion destination, determined by the insertion location determination unit 111, on the client in an amount (number), determined by the insertion amount determination unit 112 (Step S15).

The processing of inserting insertion data may be performed after the processing of replacing insertion data or may be performed in paralell.

Then, the dummy information insertion device 300 ends the processing of inserting and/or replacing dummy information. Then, the dummy information insertion device 300 performs the processing shown in FIG. 11 for each client.

The processing from Step S13 to Step S15 (the processing after replacement determination) may be performed depending on a determination result. In a case, for example, where a determination result of a certain insertion destination indicates that all is replaceable with dummy information, and a determination result of other insertion destinations indicates that all is irreplaceable with dummy information, processing for the former insertion destination may be performed first, or may be performed in an reverse order, or may be performed in paralell. The dummy information insertion device 300 may perform the processing following the replacement determination while taking into consideration of each processing load at steps from Step S13 to Step S15.

(Effect)

The replacement determination unit 600 of the determination unit 310 in the dummy information insertion device 300 according to the present example embodiment determines whether genuine information included in the insertion destination i.e. in the second location is replaceable with dummy information. Then, when the genuine information is replaceable with the dummy information, the insertion unit 120 further replaces the replaceable genuine information with the dummy information.

This enables inputting, to an attacker, more dummy information more effectively.

The insertion amount determination unit 112 in the present example embodiment determines an insertion amount and a replacement amount of dummy information on the basis of the determination result. As a result, in an amount in which dummy information can be input to an attacker, the insertion unit 120 can insert the dummy information to the insertion destination, and can replace the dummy information with the genuine information of the insertion destination. This enables the dummy information insertion device 300 to input more dummy information to an attacker. Accordingly, with the dummy information insertion device 300 according to the present example embodiment, it is possible to exert deterrent such as upset, give-up or the like on an attacker doing reconnaissance activity.

Additionally, although the above first or second example embodiment has been described assuming that the processing of each unit is automatically performed according to the flows shown in FIG. 8 or FIG. 11, each processing may be performed at timing instructed by an administrator or the like who uses the dummy information insertion device (100, 300). Each of the units may be executed, for example, according to information indicative of an insertion destination, an insertion amount and/or a replacement amount, insertion data, parameters of replacement determination and the like which are prepared in advance by the above administrator or the like.

Third Example Embodiment

Figure 12:
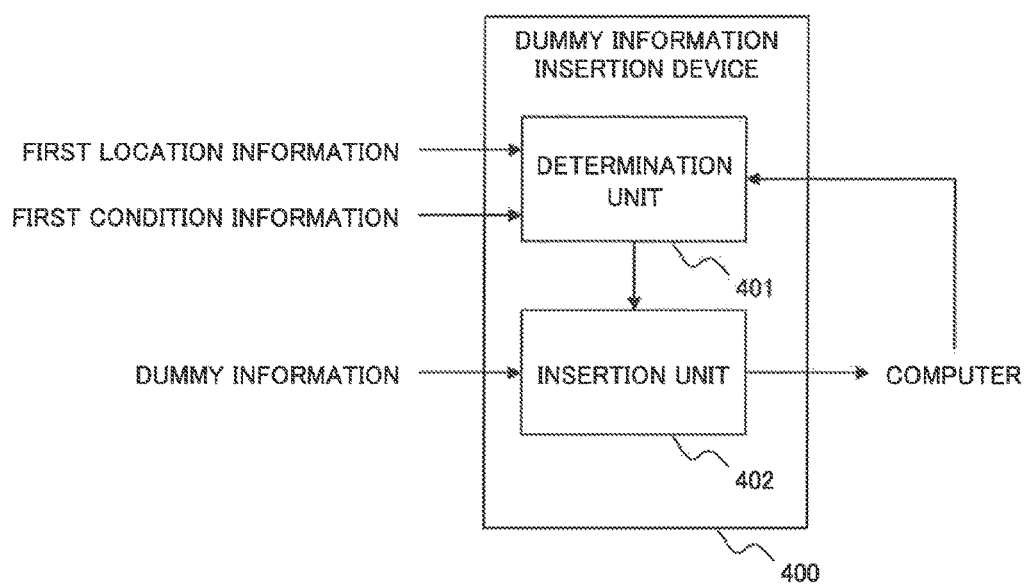
FIG. 12 is a functional block diagram representing one example of a functional configuration of a dummy information insertion device according to a third example embodiment of the present invention.

A third example embodiment of the present invention will be described in detail with reference to the drawings. FIG. 12 is a functional block diagram showing a functional configuration of a dummy information insertion device 400 according to the third example embodiment of the present invention. The dummy information insertion device 400 shown in FIG. 12 has a configuration as a basis of the dummy information insertion devices (100, 300) according to the above-described first and second example embodiments.

As shown in FIG. 12, the dummy information insertion device 400 according to the present example embodiment includes a determination unit 401, and an insertion unit 402.

The determination unit 401 determines a location (a second location) in which dummy information is to be inserted using first location information including genuine information irreplaceable with other information, in genuine information in a computer to be referred to by malicious activity and using first condition information. The dummy information resembles information in the computer and is not present in the computer and in a local network connected to the computer. The dummy information preferably resembles the irreplaceable genuine information. The first condition information represents a condition for determining the second location in which the dummy information is inserted. The first condition information is insertion location determination condition information 440 stored in the insertion condition storage unit 220 in the above-described example embodiments. The determination unit 401 supplies the insertion unit 402 with information (second location information) indicative of the determined second location.

The insertion unit 402 receives the second location information from the determination unit 401. The insertion unit 402 inserts dummy information in the second location indicated by the second location information.

As described above, the dummy information insertion device 400 according to the present example embodiment is capable of inputting dummy information to an attacker trying to collect various genuine information which is irreplaceable with dummy information similarly to the above-described first and second example embodiments.

<Configuration Example of Hardware>

Here, description will be made of a configuration example of hardware which is capable of achieving the dummy information insertion devices (100, 300, 400) according to the above-described respective example embodiments. The above-described dummy information insertion devices (100, 300, 400) may be achieved as dedicated devices, or achieved using a computer (an information processing device).

Figure 13:
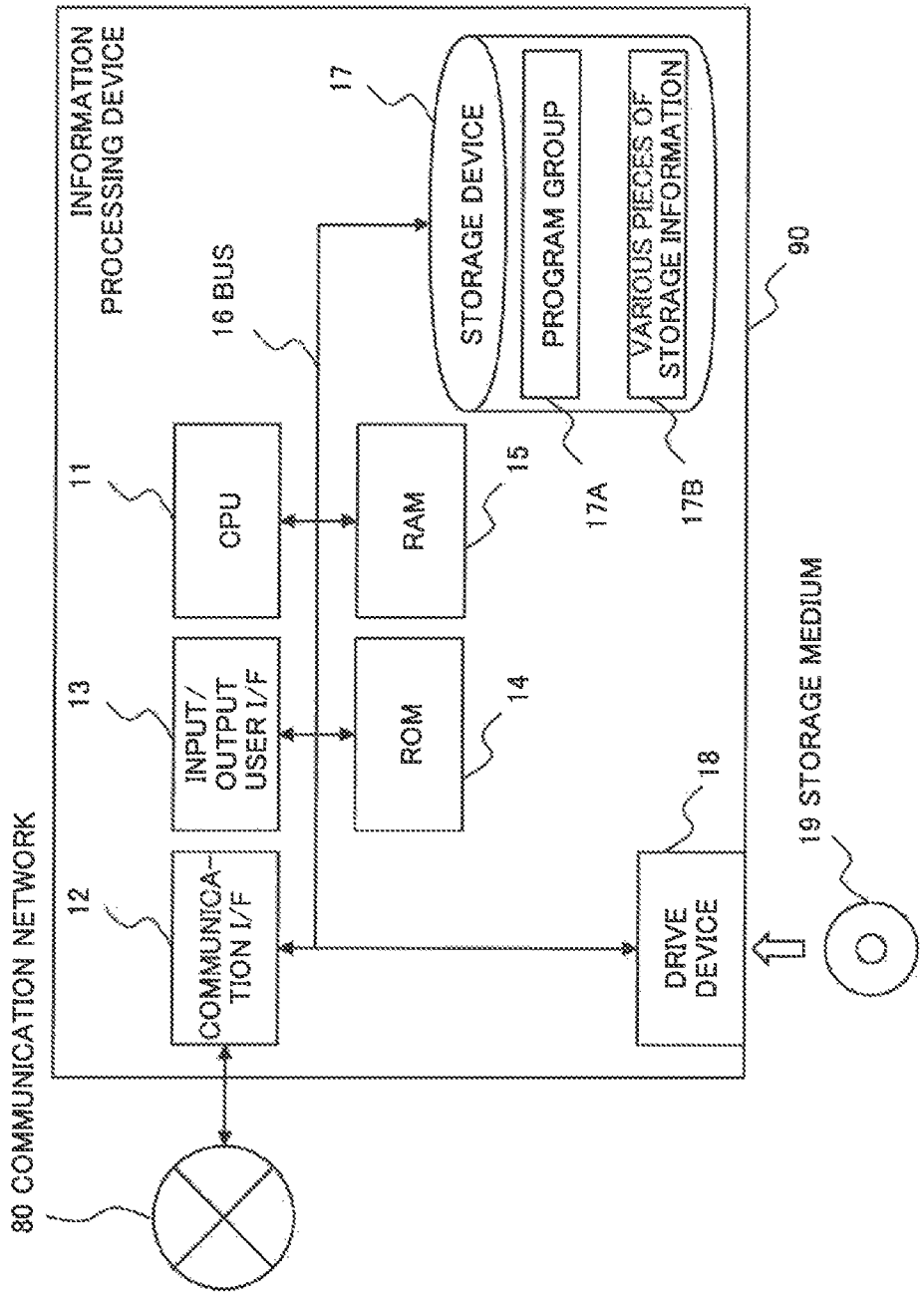
FIG. 13 is a diagram for illustratively explaining a hardware configuration of a computer (an information processing device) capable of achieving each of the example embodiments of the present invention.

FIG. 13 is a diagram illustrating a hardware configuration of a computer (an information processing device) capable of achieving the respective example embodiments of the present invention.

The hardware of an information processing device (a computer) 90 shown in FIG. 13 includes the following components:

a CPU (Central Processing Unit) 11,
a communication interface (I/F) 12,
an input/output user interface 13,
a ROM (Read Only Memory) 14,
a RAM (Random Access Memory) 15,
a storage device 17, and
a drive device 18 of a computer readable storage medium 19.

Those are connected via a bus 16. The input/output user interface 13 is a man machine interface such as a keyboard that is one example of an input device and a display as an output device. The communication interface 12 is common communication means which enables the devices (FIG. 1, FIG. 9, and FIG. 12) according to the above-described respective example embodiments to communicate with an external device via a communication network 80. In such a hardware configuration, the CPU 11 controls entire operation of the information processing device 90 which achieves the dummy information insertion devices (100, 300, 400) according to the example embodiments.

The above-described example embodiments are achieved, for example, by providing a program (a computer program) capable of achieving the processing described in the above example embodiments for the information processing device 90 shown in FIG. 13, then loading the program into the CPU 11, and executing it. Such a program may be, for example, a program capable of achieving various processing recited in the flow charts (FIG. 8, FIG. 11) referred to in the description of the above example embodiments, or achieving each of the units (each of the blocks) shown in the device in the block diagrams shown in FIG. 1, FIG. 6, FIG. 9, FIG. 10, and FIG. 12.

The program provided for the information processing device 90 may be stored in the readable/writable temporary storage memory (15), or the non-volatile storage device (17) such as a hard disk drive. That is, in the storage device 17, a program group 17A is, for example, a program capable of achieving the function of each of the units shown in the dummy information insertion devices (100, 300, 400) in the above-described example embodiments. Various kinds of pieces of the storage information 17B are, for example, the first location information, the insertion condition information, the dummy information, the second location information and the like in the above-described example embodiments. However, at the time of implementing the program on the information processing device 90, a constituent unit of an individual program module is not limited to sectioning of each of the blocks shown in the block diagrams (FIG. 1, FIG. 6, FIG. 9, FIG. 10, and FIG. 12) but may be appropriately selected by those skilled in the art at the time of implementing the program.

In the above case, as a method of supplying a program into the device, such a currently common procedure as follows is able to be adopted:

a method of installing a program into the device via various kinds of computer readable storage media (19) such as a CD (Compact Disc)-ROM, a flash memory or the like, and a method of externally downloading a program via the communication line (80) such as the Internet.

Then, in such a case, the example embodiments of the present invention can be conceived to be configured with codes (the program group 17A) forming such a computer program, or the storage medium (19) in which such codes are stored.

Then, in such a case, the present invention can be conceived to be configured with codes (the program group 17A) forming such a computer program, or the storage medium (19) in which such codes are stored.

In the foregoing, the present invention is described as an example that the present invention is applied to the exemplary example embodiments described above. However, the technical scope of the present invention is not limited to the scope recited in the above-described example embodiments. It is apparent to those skilled in the art that various modifications or improvements can be applied to such example embodiments. In such a case, a new example embodiment with such a modification or improvement added thereto also can be included in the technical scope of the present invention. And, that is apparent from the matters recited in claims.

The present application claims priority from Japanese Patent Application No. 2014-243147 filed on Dec. 1, 2014, disclosure of which is all incorporated herein.

REFERENCE SIGNS LIST

100 Dummy information insertion device
110 Determination unit
111 Insertion location determination unit
112 Insertion amount determination unit
113 Insertion data determination unit
120 Insertion unit
210 Reconnaissance destination storage unit
220 Insertion condition storage unit
230 Dummy information storage unit
300 Dummy information insertion device
400 Dummy information insertion device
401 Determination unit
402 Insertion unit
410 File location information
420 Setting information location information
430 Memory location information
440 Insertion location determination condition information
450 Insertion amount determination condition information
510 IP address
520 MAC address
530 Machine name
540 User name
550 Mail address
560 URI
600 Replacement determination unit

The invention claimed is:

1. A dummy information insertion device comprising:
at least one memory that stores:
a set of instructions;
first location information indicating a location of a first directory in a computer, the first directory including irreplaceable genuine information that is targeted by an attacker conducting malicious reconnaissance activity, wherein the irreplaceable genuine information is a part of genuine information, cannot be replaced by other information, and is used for operation of the computer; and
first condition information indicating a proximity of a location of a directory that includes the genuine information to a location of a directory into which dummy information is to be inserted; and
at least one processor configured to execute the set of instructions to:
determine a target directory based on the first location information and the first condition information; and
insert, into the target directory, dummy information that resembles the genuine information and that is not present in the computer and a local network connected to the computer.

2. The dummy information insertion device according to claim 1, wherein the at least one processor is further configured to:
acquire at least any of the genuine information included in the first directory and any genuine information included in the target directory;
generate the dummy information to be inserted into the target directory based on the acquired genuine information; and
insert the generated dummy information into the target directory.

3. The dummy information insertion device according to claim 2, wherein
the acquired genuine information includes information of a name and data, and
the at least one processor is further configured to generate the dummy information by changing the name and the data.

4. The dummy information insertion device according to claim 3, wherein the changing the name and the data comprises inserting a number or a word.

5. The dummy information insertion device according to claim 3, wherein the changing the name and the data comprises altering a number to a different number.

6. The dummy information insertion device according to claim 3, wherein the at least one processor is further configured to insert, into a line next to a line where the acquired genuine information is displayed, the dummy information generated by changing the name and the data of the acquired genuine information.

7. The dummy information insertion device according to claim 1, wherein
the first condition information indicates a number of hops in directory tree structure in the computer.

8. The dummy information insertion device according to claim 1, wherein
the at least one memory further stores second condition information indicating how much dummy information should be inserted in the target directory, and
the at least one processor is further configured to:
determine an insertion amount indicative of an amount of the dummy information to be inserted into the target directory based on the second condition information, and
insert the dummy information whose amount equals to the determined insertion amount.

9. The dummy information insertion device according to claim 8, wherein
the second condition information designates a display amount of the dummy information to be displayed when the attacker watches the target directory.

10. The dummy information insertion device according to claim 1, wherein the dummy information includes at least any of an IP (Internet Protocol) address, a MAC (Media Access Control) address, a machine name, a user name, a mail address, and a URI (Uniform Resource Identifier).

11. The dummy information insertion device according to claim 1, wherein
the at least one processor is further configured to:
further determine whether the genuine information included in the target directory is replaceable with second dummy information, and
when the genuine information included in the target directory is replaceable with the second dummy information, further replace the replaceable genuine information with the second dummy information.

12. A dummy information insertion method comprising:
storing:
first location information indicating a location of a first directory in a computer, the first directory including irreplaceable genuine information that is targeted by an attacker conducting malicious reconnaissance activity, wherein the irreplaceable genuine information is a part of genuine information, cannot be replaced by other information, and is used for operation of the computer; and
first condition information indicating a proximity of a location of a directory that includes the genuine information to a location of a directory into which dummy information is to be inserted;
determining a target directory based on the first location information and the first condition information; and
inserting, into the target directory, dummy information that resembles the genuine information and that is not present in the computer and a local network connected to the computer.

13. A non-transitory computer-readable medium storing a program which causes a computer to execute:
processing of acquiring from memory:
first location information indicating a location of a first directory in a computer, the first directory including irreplaceable genuine information that is targeted by an attacker conducting malicious reconnaissance activity, wherein the irreplaceable genuine information is a part of genuine information, cannot be replaced by other information, and is used for operation of the computer; and
first condition information indicating a proximity of a location of a directory that includes the genuine information to a location of a directory into which dummy information is to be inserted;
processing of determining a target directory based on the first location information and the first condition information; and
processing of inserting, into the target directory, dummy information that resembles the genuine information and that is not present in the computer and a local network connected to the computer.

* * * * *